May 14, 1940. L. CRISTIANI 2,200,467
APPARATUS FOR COLOR PHOTOGRAPHY
Filed May 12, 1938
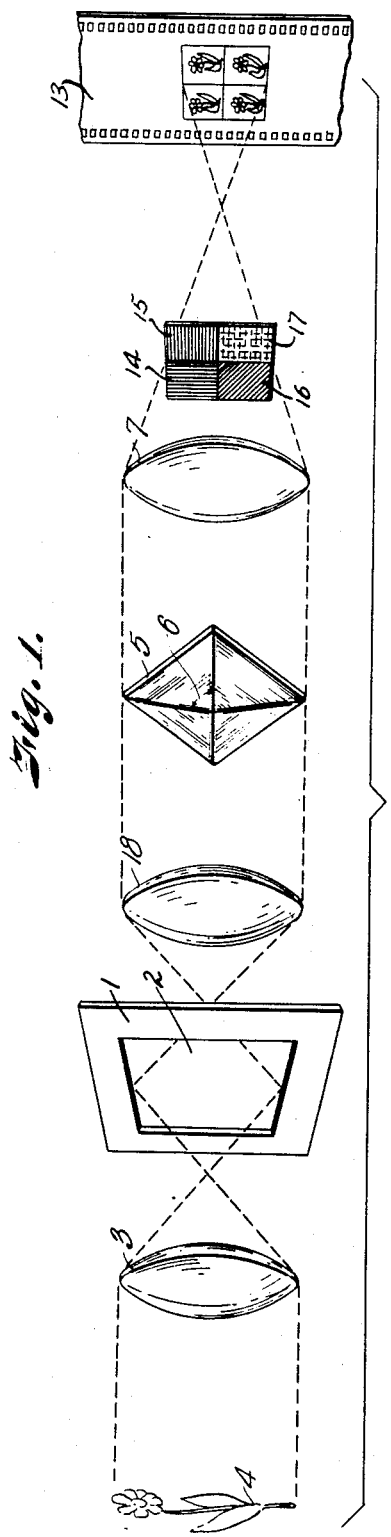
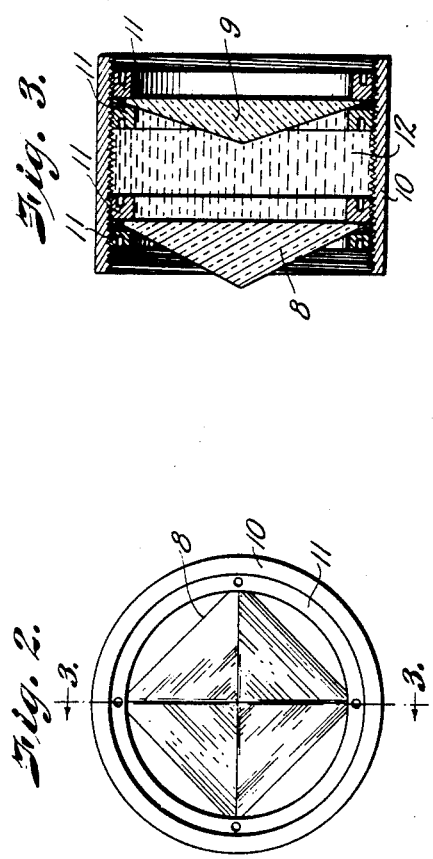
INVENTOR
Luigi Cristiani
BY
Thos. E. Scofield
ATTORNEY Patented May 14, 1940

2,200,467

UNITED STATES PATENT OFFICE 2,200,467

APPARATUS FOR COLOR PHOTOGRAPHY

Luigi Cristiani, Brooklyn, N. Y.

Application May 12, 1938, Serial No. 207,538

4 Claims. (Cl. 88—16.4)

My invention relates to apparatus for color photography and more particularly to apparatus for photographing in such a manner that the said photograph may be reproduced in colors simulating or approaching the natural coloring of the subject, it being understood that my invention applies to motion pictures as well as "stills."

It has been suggested in the prior art to photograph a subject in such manner as to obtain a plurality of identical images by means of a plurality of lenses or lens systems recording each of the images in predetermined, spaced relation upon a sensitized medium through a plurality of color filters and then obtain an image by simultaneously projecting each of the images through colored filters upon a screen in such manner that the images will be superimposed. This system has not been susceptible of practical application due to the insurmountable difficulty of producing a large number of identical lenses, which, furthermore, must be mounted with such accuracy as to give each image on the same focal plane. Obviously, the optical system of the projection apparatus must be identical with that which photographed the picture.

It has likewise been proposed to obtain a plurality of images by means of prisms for deviating the rays of the real image so as to form a plurality of images upon the sensitized medium. The same difficulties which are presented by lenses are also present when a plurality of prisms are employed and great difficulty is experienced in the practical application of this system, first, in obtaining a plurality of prisms identical with each other in optical properties, and further, the positioning of the prisms with respect to each other so as to produce identical deviation is impossible of practical achievement. The result has been that in other proposed systems the same optical system which has taken the picture must be used for projecting it. In commercial motion picture work, it is essential that a film taken with one camera may be projected by any number of projectors irrespective of the camera which photographed the film. Furthermore, if the prisms are interposed in the second objective or placed behind it, the angles of the prisms must be so great that an astigmatic effect is produced. Then, too, there is the well known effect of a prism, the angle of which is great, to divide a ray of white light into its component colors, giving rise to what is known as chromatic aberration.

It will be obvious that in order to produce a clear picture of color value approaching that of the subject or screen photographed, the several images must be exactly, or almost exactly, superimposed. For practical results, a tolerance of not more than one hundredth of a millimeter is permissible on the film.

In copending application, Serial No. 121,227, in which I am a joint inventor with Giovanni Mascarini, there is shown an apparatus for color photography and cinematography, in which a plurality of images are formed in accordance with a function of the individual components of color values of a complete picture and monochrome projections of the individual images in accordance with the color by which they were produced are projected in superimposed relation upon a common place, in which the disadvantages of the prior art are minimized.

In the optical system according to that application, the distance between the window screen and the prism is fixed for a given size of window and a fixed prism angle. Exact superposition may be obtained with the prior apparatus only for objects which focus in the focal plane of the first objective, that is, those objects which are in focus in the window aperture. Since the prism must be a fixed distance from the focal plane of the first objective, that is, from the window screen, those objects focusing in front of or in back of the window screen will be slightly out of juxtaposition, introducing a slight fuzziness.

I propose to position a second lens its focal distance from the window screen so that rays of light passing through this second lens of objective will be in substantially parallel beams. The prism angle will depend upon the size of the window and the focal length of the lens producing the parallel beams. A reduction in the size of the window will call for reduction of the prism angle and an increase in the size of the window will call for an increase in the prism angle with the same focal length lens. By movement of the prism away from the window, with the new arrangement, it will be possible to reduce parallax error to a minimum for motion pictures, as there is no appreciable loss of light due to the fact that the light beams are projected from the intermediate objective in substantially parallel beams. The intermediate objective may project the light beams with a slight convergence or a slight divergence. The position of the second objective with respect to the window aperture will determine whether the light beams are parallel, convergent or divergent. If the second objective is positioned its focal length from the window aperture, the light beams will be parallel. Light beams from objects short of focus will be slightly divergent and light beams of objects beyond the focal distance will be slightly convergent.

When the light beams are convergent or divergent, any movement of the prism produces a different displacement of the window. With convergent light, when the prism is moved toward the window from a point where the images are in juxtaposition, there is produced a displacement of the projected images, separating them. If, on the other hand, the prism is moved away from the window, the images tend to come together and superpose.

In projecting an image, the image, when focused at the window, will be projected in parallel rays through the intermediate objective. Objects focusing in front of the window screen will produce convergent light beams when projected through the intermediate lens. In superposing the images, those objects out of focus are not properly superposed due to parallax. This parallax however, can be substantially eliminated by movement of the prism away from the window without affecting the superimposing of the objects which are in focus.

In the accompanying drawing which forms part of the instant specification and is to be read in conjunction therewith and in which like reference numerals are used to indicate like parts in the various views;

Figure 1 is a diagrammatic view showing the optical system of my apparatus, it being understood, of course, that the same system is to be used for projecting with a light source behind the transparent film.

Figure 2 is a plan view of the prism assembly adapted to be used in carrying out my invention.

Figure 3 is a sectional view taken on a line 3—3 of Figure 2.

More particularly referring now to the drawing, an opaque screen 1 is formed with a window aperture 2 which may be of any suitable size. Assuming for purposes of illustration but not by way of limitation, that I am employing a standard 35 millimeter film, a window aperture comprising a square 36 x 36 millimeters may be used.

An objective lens 3 may be of any suitable type adapted to focus an object 4 upon the screen 1 so that, if a ground glass were placed in the window aperture 2, the image of the object 4 would be reproduced on the ground glass in exact focus. A second objective 18 of any suitable type is positioned its focal length behind the screen 1. As pointed out hereinabove, the image of the object 5 in focus in the window aperture 2 will be projected by the second objective 18 in parallel beams of light. Objects out of focus having a focal point in front of the window will produce convergent beams of light when projected by the intermediate or second objective 18.

A prism 5 is formed, preferably out of one piece of glass and is provided with four faces, the angles of which are the same as the angles produced by drawing diagonals across the window which is used. For example, where the window is square the angle 6 may be 90° plus or minus 10 seconds, since a deviation of 15 seconds will be sufficiently accurate for practical purposes. For objects focusing exactly in the aperture 2 of the window screen 1, the prism 5 may be moved toward or away from the window screen 1 without affecting the juxtaposition of the plurality of images formed by the prism. The parallax produced by objects out of focus can be substantially eliminated by moving the prism away from the window, thus enabling the third objective 7 to project four images in exact juxtaposition upon a sensitized surface 13. It will be understood, of course, that the dimensions of the images projected by lens 7 will vary in accordance with the focal length of this lens. It will be obvious that, with a 35 millimeter film, if it is desired, for example, to form four images each of which is 9 x 9 millimeters, in order to remain within moving picture dimensions of 18 millimeters, the lens 7 must have a focal length so as to reduce the size of the window aperture from 36 x 36 millimeters to 9 x 9 millimeters.

It will be noted that, in my optical system, the distance of the second objective 18 from the window screen is fixed. A juxtaposition may be readily achieved by adjusting the prism 5. Any suitable lens, therefore, may be used, as objectives 3, 18 and 7, since these objectives do not influence the juxtaposition of the images. It will be further apparent that, in order that commercial use may be made of my invention, that the prisms must be made in quantity. Any one prism must be substantially identical with every other prism in order that film made with one optical system may be projected with another optical system. Any inaccuracy in the prism will result, when projection is had, in a plurality of images which are not exactly or substantially exactly superimposed, and the clarity of the picture, as well as the color values will be distorted.

The prism 5 is always placed in such a position as to give four images in exactly juxtaposed position, that is, the bottom of the upper left-hand image will form the border line of the upper border of the lower left-hand image and the right-hand border line of the upper left-hand image will exactly coincide with the left border line of the upper right-hand image. Similarly, the lower border line of the upper right-hand image will exactly coincide with the upper border line of the lower right-hand image and the left border line of the lower right-hand image will coincide with the right border line of the lower left-hand image. In this manner, inaccuracies or dissimilarities in several lenses will have no effect upon the accuracy of superimposition when the film is projected, as will be hereinafter more fully described. It will be obvious to those skilled in the art that the sole determining feature of accuracy of superimposition will depend upon the accuracy with which the prism 5 is made.

In the formation of chromatic pictures by the synthetic integration of a plurality of similar monochrome images of the same subject, commercial success will depend upon the ability to superimpose the various images exactly upon each other with accuracy and ease, and the means for so superimposing the several images must be susceptible of quantity production wherein each means is capable of identical or substantially identical performance. It will be observed that by means of our system small angles may be given to the prism, and in this manner both spherical and chromatic aberration is minimized. In order to correct, however, any tendency of chromatic aberration due to the fact that rays of different colors will focus at different points, I make my prism as shown in Figures 2 and 3. Each of the prism faces shown are right triangles, and in order to get sufficient interchangeability the right angle can not be varied from more than plus or minus ten seconds. It follows that, since the four faces of the prism are ground from one block of optical glass, the angles arranged along the axis of displacement will be optically established and remain constant. In order to eliminate chromatic aberration, I employ the structure shown in Figures 2 and 3. Two monoblock prisms 8 and 9 are mounted in any suitable mounting means, as, for example, mounting tube 10. The angle of deviation of the four faces in prism 8 is greater than that in prism 9. The two prisms are assembled as shown in Figure 3 and held in position by means of mounting rings 11. The space between the prisms 8 and 9 is filled with a liquid 12 having great dispersive power. I prefer to use high boiling, optically clear organic liquids, such as methyl cinnamate boiling at 259° C., methyl caprate boiling at 224° C., ethyl cinnamate boiling at 271° C., linalyl acetate boiling at 220° C., meta meta prime ditolyl boiling at 288° C., dimethylmalate boiling at 242° C., alpha citral boiling at 299° C., cinnamic aldehyde boiling at 251° C., normal butyl stearate boiling at 220° C., benzyl ether boiling at 298° C., ortho anisidine boiling at 224° C., paramethoxybenzaldehyde boiling at 247° C.

The relative position of the two monoblock prisms has no influence on the deviation angle. The deviation angles of the various images depend solely upon the optical construction of the monoblock, which construction may be made substantially perfect, an accuracy of plus or minus five seconds being easily achieved, though plus or minus ten seconds would be tolerable. The assembly just described, that is, the use of two monoblock prisms with a liquid of high dispersive power positioned therebetween will substantially eliminate all chromatic aberration of prism 8.

The objective 7 is of such focal length and is placed at such distance that it will focus four juxtaposed images upon a sensitive plate or film 13. For color photography each of the images will be such that it will be made substantially by the action of a single color, which result is obtained by the use of filters. One of the images, for example, will be made substantially by red light, filter 14 allowing red rays to pass. Filter 15 allows an image made by blue light, the filter being such as to allow blue rays to pass. Filter 16 allowing green rays to pass, the image produced on the film will be made preponderantly by green light, and an image passing through yellow filter 17 will affect the film largely by yellow light. It is understood, of course, that the film must be panchromatic, that is, it must be sensitive to all colors. It is understood, of course, that the filter must be accurately aligned. The filter may be placed in any desired position, and if desired, the four inclined faces of the prism 5 may be tinted to act as filters, thus insuring at all times that each image will be of desired monochrome.

In nature, when colors are observed, the various colors are seldom saturated, since as the eye observes them they are flooded with light and each color is diluted, so to speak, with the white light. In the color processes now used, an artificial effect is produced due to the sharpness of color changes and the effect is not natural. If we want to have the sensation of color as the same is observed in nature, we must see the color more or less with the same degree of dilution. In observing motion pictures, the projection room is usually darkened and the dilution of color must be given by the filter itself in such a way that the filter will permit not only the color corresponding to it to pass but also to permit the passage of a certain quantity of white light. Accordingly, my filters are very light, permitting the total passage of sixty to eighty percent of the light, while standard filters permit only thirty to forty percent of the light to pass. Furthermore, panchromatic film is not equally sensitive to all colors and in order to compensate for the various sensitivities of the film I vary the filter color accordingly. For example, if a film is more sensitive to yellow than to red, the yellow filter will be of darker color than the red in order to bring the sensitivity of the film to a substantially common plane, thus avoiding over-exposure of one color and under-exposure of another color.

It will be observed that the area of the four images on the film in the example given is 18 x 18 millimeters, while the area of the aperture is 36 x 36 millimeters. The light from an area 36 x 36 millimeters is concentrated upon an area 18 x 18 millimeters, so that the film will be illuminated four times more strongly than by the illumination given by the first objective lens. For example, if the lens 3 had an illumination of 1 to 1.5 effective illumination would be 1 to .37. It will be readily apparent to those skilled in the art that with suitable ratios between the area of the aperture 2 and the area occupied by the four small images on the film, very great luminosity may be obtained.

What is true for luminosity is also true for the field. It will be observed that if in the aperture used by way of illustration, namely, 36 x 36 millimeters, we form an image given by 50 millimeter lens, the field in that aperture is exactly double that which is obtained with an aperture of 18 x 18 millimeters, which would be the normal image given by a 50 millimeter lens on a standard field. It follows, therefore, that the field of the four images of 9 x 9 millimeters, each of which reproduces the field contained in an aperture of 36 x 36 millimeters, will be twice that of the normal value, thus enabling the obtaining of large fields by the use of standard lenses.

The projection of my film to obtain a colored image will be clear to those skilled in the art. From the negative obtained, a positive is printed on film if it is desired to have colored moving pictures. Each of the images having been formed by monochrome light, will represent a similar proportion of that particular color in the subject which was photographed. Each of the images is passed through a filter of color corresponding to that with which it was taken and the prism will combine the various images into one, superimposing them exactly upon the focal plane of the objective lens 3, forming a complete picture in natural colors analogous to that obtained by four color printing.

To obtain colored prints, it is possible to have a multicoated paper with emulsions sensitive to various colors on which the images are projected in superimposed relation by means of a projection system comprising my optical system. For example, if it is desired to make a color transparency using "Kodachrome" or "Dufay" film, the positive is projected by means of my projection apparatus through filters upon the film and the film developed in accordance with the particular process designed for it.

It will be observed that I have accomplished the objects of my invention. I have provided apparatus for color photography in which ordinary panchromatic film may be used and in which the parallax of objects out of focus may be easily corrected by slight adjustment of the prism without changing the superposition of objects which are in focus.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In an optical system for color photography, an opaque screen, said screen being provided with a window aperture, a prism having a plurality of light refracting surfaces for providing a plurality of complete light beams corresponding to said aperture in predetermined relation, an objective positioned in front of said screen, the focal plane of said objective being in the plane of the screen, a second objective positioned behind said screen, adapted to project the image erected in said window aperture in substantially parallel rays of light, said prism being positioned behind said second objective, a third objective positioned behind said prism adapted to project the plurality of beams in predetermined separate relation upon a sensitized surface, and means to support the sensitized surface in the focal plane of said third objective.

2. In an optical system for color photography, an opaque screen, said screen being provided with a window aperture, a prism having a plurality of light refracting surfaces for providing a plurality of complete light beams corresponding to said aperture in predetermined relation, an objective positioned in front of said screen, the focal plane of said objective being in the plane of the screen, a second objective positioned behind said screen, adapted to project the image erected in said window aperture in substantially parallel rays of light, said prism being positioned behind said second objective, a third objective positioned behind said prism adapted to project the plurality of beams in predetermined separate relation upon a sensitized surface, means to support the sensitized surface in the focal plane of said third objective, and a multicolor filter having color components corresponding in number to said beams, the axis of said color components coinciding with the axis of said prism.

3. An optical system as in claim 1 wherein said prism is a prism assembly comprising a first prism having a plurality of refracting surfaces, a second prism symmetrical with said first prism and positioned on the same optical axis in spaced relation therefrom, and a medium having high light dispersive properties positioned between said prisms.

4. An optical system as in claim 2 wherein said prism is a prism assembly comprising a first prism having a plurality of refracting surfaces, a second prism symmetrical with said first prism and positioned on the same optical axis in spacing relation therefrom, and a medium having high light dispersive properties positioned between said prisms.

LUIGI CRISTIANI.